United States Patent [19]

Werner

[11] 3,791,820

[45] Feb. 12, 1974

[54] FLUXLESS ALUMINUM BRAZING

[75] Inventor: William J. Werner, Clinton, Tenn.

[73] Assignee: The Unites States of America as represented by the United States Atomic Energy Commission, Washington, D.C.

[22] Filed: June 23, 1972

[21] Appl. No.: 266,372

Related U.S. Application Data

[62] Division of Ser. No. 77,762, Oct. 2, 1970.

[52] U.S. Cl. ................... 75/140, 75/141, 75/143, 75/148
[51] Int. Cl. ............................................. C22c 21/00
[58] Field of Search ...... 75/138, 140, 141, 143, 148

[56] References Cited
UNITED STATES PATENTS

| | | | |
|---|---|---|---|
| 1,572,459 | 2/1926 | Archer | 75/141 |
| 2,238,399 | 4/1941 | Schlucter | 75/148 |
| 2,258,681 | 10/1941 | Hoglund | 75/148 |
| 3,168,381 | 2/1965 | Finnegan | 75/148 |
| 3,705,029 | 12/1972 | Foerster | 75/148 |

Primary Examiner—Hyland Bizot
Attorney, Agent, or Firm—Roland A. Anderson; John A. Horan; Irving Barrack

[57] ABSTRACT

This invention relates to a fluxless brazing alloy for use in forming brazed composites made from members of aluminum and its alloys, said brazing alloy consisting of, in weight percent, 35–55 percent aluminum, 10–20 percent silicon, 25–60 percent germanium; 65–88 percent aluminum, 2–20 percent silicon, 2–18 percent indium; 65–80 percent aluminum, 15–25 percent silicon, 5–15 percent yttrium.

1 Claim, No Drawings

FLUXLESS ALUMINUM BRAZING

This is a division of application Ser. No. 77,762, filed Oct. 2, 1970.

The invention described herein was made in the course of, or under, a contract with the U. S. Atomic Energy Commission.

SUMMARY OF THE INVENTION

The present invention relates to the fluxless brazing of aluminum and its alloys. The invention may be regarded in three aspects: (1) a class of brazing filler alloys which melt and flow over a narrow range of temperature to form a sound metallurgical joint between aluminum alloy parts; (2) the process for forming brazed composites with the subject brazing alloys; and (3) the resultant brazed composite.

Any alloy designated as a brazing filler alloy must satisfy at least two basic criteria. It must first wet the surfaces of the parts to be joined. By wetting is meant the ability of the molten brazing filler alloy to conform to the base metal surface and, as a result, when cooled below its solidus temperature, to form a strong bond to that metal. Flow is the property of the brazing alloy that determines the distance it will travel in the molten state away from its original position due to the action of capillary forces. To flow well, an alloy should not suffer any appreciable increase in its liquidus temperature even though its composition may be altered by dissolution of the base metal. This is extremely important in aluminum brazing since the brazing operation is performed very near the liquidus temperature.

Wettability and flowability are functions of both the brazing filler alloy and the metal or alloy to be joined. In the case of aluminum alloys, the characteristic tenacious oxide which forms on the surface of aluminum alloys has long been recognized as a detriment to brazing operations. For the most part, the prior art requires chemical cleaning of the parts to be joined to remove thick oxide films and the use of a separate corrosive flux during braze bonding. Use of the flux effects removal of the oxide, allowing the molten brazing alloy to come in contact with an oxide-free surface to form the required joint. However, while the use of a flux is an aid to wetting and flowing, its subsequent complete removal is difficult and in many cases impossible. Any flux trapped in the final joint can be detrimental from both a strength and corrosion standpoint.

The present invention is predicated on the discovery of a class of brazing alloys which have the capacity to form a brazed bond between aluminum and aluminum alloy parts without the necessity of using a corrosive flux. The fluxless brazing filler alloys falling within the scope of this invention are further characterized in that they are selected from the group consisting of, in weight percent, a. a ternary alloy of aluminum, silicon, and germanium having a flow temperature in the range 1020° to 1095° F. and a composition consisting essentially of 35–55 percent aluminum, 10–20 percent silicon, and 25–60 percent germanium;

b. a ternary alloy of aluminum, silicon, and indium having a flow temperature in the range 1075° to 1095° F. and a composition consisting essentially of 65–88 percent aluminum, 2–20 percent silicon, and 2–18 percent indium;

c. a ternary alloy of aluminum, silicon, and yttrium having a flow temperature in the range 1095° to 1140° F. and a composition consisting of 65–80 percent aluminum, 15–25 percent silicon, and 5–15 percent yttrium.

The brazing filler alloys within the scope of this invention have the capacity to form sound brazed composites of aluminum and aluminum alloy parts when utilized in accordance with the procedure to be described. The brazing filler alloys were formulated by Tungsten Inert Gas (TIG) melting techniques to form alloy buttons which were subsequently cut into appropriate sized pieces and preplaced on the faying surfaces. Alternatively, the alloy buttons can be worked to form wire or sheet--forms which are eminently suitable for production-type brazing operations.

In the ensuing description I shall describe braze bonding of the aluminum alloys in Table I.

TABLE I

| Composition (wt. %) | Alloy Designation | |
|---|---|---|
| | 6061 | 2219* |
| Si | .40–.8 | .20 |
| Fe | .7 | .30 |
| Cu | .15–.40 | 5.8–6.8 |
| Mn | .15 | .20–.40 |
| Mg | .8–1.2 | .02 |
| Cr | .04–.35 | — |
| Zn | .25 | .10 |
| Ti | .15 | .02–.10 |
| Melting Range (°F.) | 1080-1200 | 1010-1190 |

*Vanadium, 0.05–0.15; zirconium, 0.10–0.25.

There are several factors which are of prime importance to fluxless brazing with the brazing filler alloys of this invention. The first is cleanliness of the surfaces to be joined. The surface of any aluminum or aluminum alloy part forms a tenacious oxide film even at room temperature and under vacuum conditions. While oxidation of aluminum or aluminum alloys takes place even in vacuum or inert atmospheres, a practical, successful fluxless brazing operation can be performed, provided that the faying surfaces, i.e., the surfaces to be joined, are pretreated by a chemical cleaning action which provides a "workably thin" oxide film. By a workably thin oxide film is meant a surface oxide film which is sufficiently thin to be penetrated by the fluxless brazing filler alloys of this invention, thereby allowing the desired wetting and flowing action needed to produce a brazed joint. I find that in order to produce a workably thin oxide film it is necessary to subject the surfaces to be joined to a chemical cleaning action, the exact nature of which depends on the alloy composition of the parts to be joined as well as the brazing alloy. For example, the 6061 and 2219 alloys can be satisfactorily cleaned to produce a workable surface by immersion into a 20 volume percent nitric acid — 2 volume percent HF — water solution at room temperature for a period ranging from 1 to 3 minutes. The cleaning step is followed immediately by a cold water rinse which in turn is followed by a flush with acetone. The chemically cleaned parts maintain their workable surfaces for a limited time so that brazing should occur fairly soon after cleaning. Effective brazing with the alloys of this invention is best carried out in vacuum at a pressure less than about $1 \times 10^{-5}$ Torr at the brazing temperature. After the brazing alloy has melted and flowed along the faying surfaces, the brazed part may be cooled in an inert atmosphere such as helium and argon to complete the brazing cycle. Care should be exercised in the time-temperature cycle used to heat the work up to the brazing temperature since the workable surface produced by the chemical pre-cleaning operation may be destroyed by an overly long preheating cycle. The optimum heating cycle is a matter of routine procedure and, once established for a particular alloy system, will present no difficulty.

Brazing filler metal wettability and flowability determinations were performed using base metal pads of the alloys shown in Table I. Both the pads and the experimental brazing filler metals were cleaned prior to undergoing a thermal cycle for determination of melting temperature and wettability. The aluminum-silicon-germanium fluxless brazing filler alloy compositions within the scope of this invention are shown in Table II below.

TABLE II

Flow Temperatures and Compositions of the Al-Si-Ge Alloys

| Alloy No. | Composition (wt. %) | | | Flow Temperature (°F.) |
|---|---|---|---|---|
| | Al | Si | Ge | |
| 1 | 55 | 5 | 40 | 1020 |
| 2 | 55 | 10 | 35 | 1060 |
| 3 | 55 | 15 | 30 | 1060 |
| 4 | 55 | 20 | 25 | 1065 |
| 5 | 45 | 5 | 50 | 1020 |
| 6 | 45 | 10 | 45 | 1060 |
| 7 | 45 | 15 | 40 | 1065 |
| 8 | 45 | 20 | 35 | 1095 |
| 9 | 35 | 5 | 60 | 1020 |
| 10 | 35 | 10 | 55 | 1065 |
| 11 | 35 | 15 | 50 | 1075 |
| 12 | 35 | 20 | 45 | 1075 |

All of the alloys formulated and shown in Table II melted at a temperature within the range 1020° to 1095° F. and showed excellent flowability on aluminum alloy 6061. Generally, the flow temperatures of these alloys increased with increasing silicon content. All of the alloys containing 5 weight percent silicon exhibited flow temperatures of 1020°F. When the silicon content was increased to 20 weight percent, the flow temperature was raised to as high as 1095°F. "T" joints made with brazing filler metal alloy No. 9 were made by preplacing the brazing alloy at one end of the joint and allowing it to flow along the entire length by capillary action. Brazing was performed by holding at temperature 2-½ minutes at 1020°F. in vacuum. The resultant brazed joint showed smooth, even filleting along its entire length, with no evidence of porosity. Wetting and flow characteristics of all of the alloys within the range of composition shown in Table II showed excellent wetting and flow characteristics. Extensive testing with all of these alloys shows that the brazing time should be reduced to a minimum in order to avoid excessive reaction with the base alloy. For example, I find that a brazing time of 10 minutes for Alloy No. 5 at 1020°F. will cause excess reactivity with the base alloy, while a brazing time of less than 3 minutes produces an excellent joint, with no evidence of over-reaction. In general terms, it can be stated that the time at temperature for all of the alloys should be kept at a minimum to avoid excess reaction with the base metal.

Flow temperatures and compositions of brazing filler alloys within the aluminum-silicon-indium system are shown in Table III below.

TABLE III

Flow Temperatures and Compositions of the Al-Si-In Alloys

| Alloy No. | Composition (wt. %) | | | Flow Temperature (°F.) |
|---|---|---|---|---|
| | Al | Si | In | |
| 1 | 88 | 10 | 2 | 1095 |
| 2 | 80 | 18 | 2 | 1095 |
| 3 | 75 | 23 | 2 | 1095 |
| 4 | 83 | 7 | 10 | 1095 |
| 5 | 75 | 15 | 10 | 1085 |
| 6 | 70 | 20 | 10 | 1085 |
| 7 | 80 | 2 | 18 | 1095 |
| 8 | 72 | 10 | 18 | 1075 |
| 9 | 65 | 17 | 18 | 1085 |

"T" joints produced by vacuum brazing the base metal alloys shown in Table I with the aluminum-silicon-indium braze alloys showed excellent filleting, with no excess filler metal — base metal reaction for brazing times less than 5 minutes.

Selected brazing alloy compositions within the aluminum-silicon-yttrium system suitable for the purposes of this invention are shown in Table IV below.

TABLE IV

Flow Temperatures and Compositions of the Al-Si-Y Alloys

| Alloy No. | Composition (wt. %) | | | Flow Temperature (°F.) |
|---|---|---|---|---|
| | Al | Si | Y | |
| 1 | 85 | 10 | 5 | 1120 |
| 2 | 80 | 15 | 5 | 1140 |
| 3 | 75 | 15 | 10 | 1110 |
| 4 | 75 | 20 | 5 | 1130 |
| 5 | 70 | 20 | 10 | 1140 |
| 6 | 65 | 20 | 15 | 1140 |
| 7 | 70 | 25 | 5 | 1095 |

The utility of these alloys is limited to brazing higher melting aluminum alloys such as the 6061 system. In alloy pad tests using 6061 base metal, excellent wetting and flow were demonstrated for each of the alloys shown in Table IV. Once again, careful control of the time-temperature thermal cycle is necessary to avoid excess penetration of the base metal due to base metal — brazing filler metal interaction. While the higher flow temperatures of alloys in the aluminum-silicon-yttrium system limit their use relative to the germanium- and indium-containing ternary systems, their utility may be expanded by adding small quantities, up to 5 percent, of such elements as copper, tin, or zinc in order to affect reduction in the flow point. When this occurs, a concomitant wider latitude in the time-temperature thermal cycle results, thus reducing the possibility of excess base metal — filler metal interaction.

By the term "consisting essentially of" as used in the specification I mean to include the effective range of proportions of deliberately added alloy ingredients, but not to exclude unspecified impurities which normally contaminate such alloys during their process of manufacture.

What is claimed is:

1. A fluxless brazing alloy for use in forming brazed composites made from aluminum and its alloys, said brazing alloy consisting essentially of, in weight percent, 2–23 percent silicon, 2–18 percent indium, 65–88 percent aluminum, and up to 5 percent of at least one metal selected from the group consisting essentially of copper, zinc and tin.

* * * * *